US012699748B2

(12) United States Patent
Li et al.

(10) Patent No.: US 12,699,748 B2
(45) Date of Patent: Aug. 4, 2026

(54) DATA PROCESSING METHOD AND APPARATUS APPLIED TO GRAPHICS PROCESSING UNIT, AND ELECTRONIC DEVICE

(71) Applicant: Alibaba Group Holding Limited, Georgetown (KY)

(72) Inventors: Yinghan Li, Beijing (CN); Zhenyu Gu, Beijing (CN); Shaoxuan Wang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 1172 days.

(21) Appl. No.: 17/543,602

(22) Filed: Dec. 6, 2021

(65) Prior Publication Data

US 2022/0188380 A1 Jun. 16, 2022

(30) Foreign Application Priority Data

Dec. 14, 2020 (CN) .......................... 202011465448.2

(51) Int. Cl.
    G06F 17/16 (2006.01)
    G06F 7/76 (2006.01)
    G06F 9/30 (2018.01)
(52) U.S. Cl.
    CPC ................ G06F 17/16 (2013.01); G06F 7/76 (2013.01); G06F 9/3013 (2013.01)
(58) Field of Classification Search
    CPC ......................................................... G06F 7/76
    See application file for complete search history.

(56) References Cited

U.S. PATENT DOCUMENTS 11,043,472 B1    6/2021   Dokania et al.
11,055,810 B1    7/2021   Dhingra et al.
                 (Continued)

OTHER PUBLICATIONS

F. Giesen, "SIMD transposes 1", The ryg blog, Jul. 9, 2013. URL: https://fgiesen.wordpress.com/2013/07/09/simd-transposes-1/ (Year: 2013).*

*Primary Examiner* — Andrew Caldwell
*Assistant Examiner* — Jonathan David Warner

(57) ABSTRACT

This application provides a data processing method applied to a GPU, including: reading a to-be-processed matrix from memory corresponding to a target GPU into registers in a target streaming multiprocessor, where the target streaming multiprocessor is a streaming multiprocessor adapted to perform a matrix computation on the to-be-processed matrix; in a process of reading the to-be-processed matrix from the registers into shared memory corresponding to the registers, performing a first preset operation on the to-be-processed matrix to obtain an initial matrix corresponding to the to-be-processed matrix; and in a process of reading the initial matrix from the shared memory into the registers, performing a second preset operation on the initial matrix to obtain a target matrix meeting a matrix multiplication operation requirement of a matrix-dedicated computation unit. The data processing method applied to a graphics processing unit (Graphics Processing Unit, GPU) can transform a to-be-processed matrix into a target matrix meeting a matrix multiplication operation requirement of the GPU, thereby improving applicability of the GPU for matrix multiplication operations.

18 Claims, 5 Drawing Sheets

(56) References Cited

U.S. PATENT DOCUMENTS

| | | | |
|---|---|---|---|
| 2019/0187985 A1* | 6/2019 | Tran ....................... | G06F 9/383 |
| 2021/0124582 A1 | 4/2021 | Kerr et al. | |
| 2021/0133123 A1* | 5/2021 | Feehrer .............. | G06F 12/0607 |
| 2021/0200545 A1 | 7/2021 | Marolia et al. | |
| 2021/0216039 A1 | 7/2021 | Wenus et al. | |
| 2021/0217132 A1 | 7/2021 | Mccombe et al. | |
| 2021/0232215 A1 | 7/2021 | Mccombe et al. | |
| 2021/0247910 A1 | 8/2021 | Kim et al. | |
| 2021/0248459 A1 | 8/2021 | Li et al. | |
| 2021/0304355 A1 | 9/2021 | Delattre et al. | |
| 2021/0304356 A1 | 9/2021 | Delattre et al. | |
| 2021/0312697 A1 | 10/2021 | Maiyuran | |
| 2021/0326176 A1 | 10/2021 | Maiyuran et al. | |
| 2021/0326696 A1 | 10/2021 | Kim et al. | |
| 2021/0350499 A1 | 11/2021 | Surti et al. | |
| 2021/0358574 A1 | 11/2021 | Getz et al. | |
| 2021/0365840 A1 | 11/2021 | Park et al. | |
| 2021/0373895 A1* | 12/2021 | Shahim ................... | G06F 3/061 |

* cited by examiner

Figure 2:
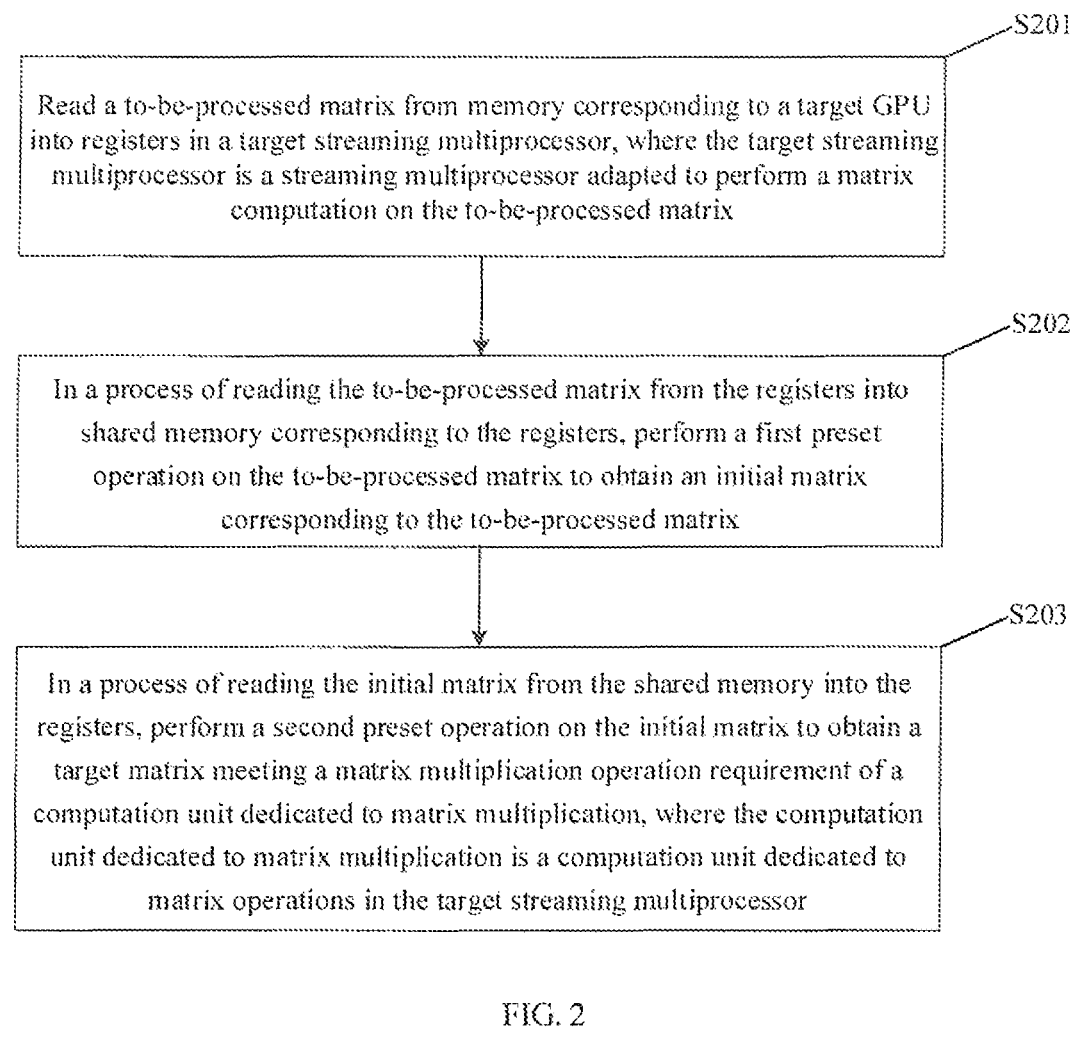

S201

Read a to-be-processed matrix from memory corresponding to a target GPU into registers in a target streaming multiprocessor, where the target streaming multiprocessor is a streaming multiprocessor adapted to perform a matrix computation on the to-be-processed matrix

S202

In a process of reading the to-be-processed matrix from the registers into shared memory corresponding to the registers, perform a first preset operation on the to-be-processed matrix to obtain an initial matrix corresponding to the to-be-processed matrix

S203

In a process of reading the initial matrix from the shared memory into the registers, perform a second preset operation on the initial matrix to obtain a target matrix meeting a matrix multiplication operation requirement of a computation unit dedicated to matrix multiplication, where the computation unit dedicated to matrix multiplication is a computation unit dedicated to matrix operations in the target streaming multiprocessor

601
To-be-processed matrix reading unit

602
First preset operation execution unit

603
Second preset operation execution unit

DATA PROCESSING METHOD AND APPARATUS APPLIED TO GRAPHICS PROCESSING UNIT, AND ELECTRONIC DEVICE

TECHNICAL FIELD

This application relates to the field of computer technologies, and in particular, to a data processing method applied to a graphics processing unit. This application also relates to an apparatus applied to a graphics processing unit, an electronic device, and a storage medium. This application further relates to another data processing method applied to a GPU.

BACKGROUND

A graphics processing unit (Graphics Processing Unit, GPU), also referred to as a graphics core, a vision processing unit, or a graphics chip, is a microprocessor used for performing image processing and graphics-related computations, for example, general purpose computations such as matrix multiplication, on computing devices such as personal computers, tablet computers, and smart phones. When a GPU is used for matrix multiplication computations, there are certain limitations to arrangement methods of a matrix to be input into a computation unit dedicated to matrix multiplication used for matrix-related operations in the GPU. The computation unit dedicated to matrix multiplication is a computation unit dedicated to matrix-related operations in a streaming multiprocessor. For example, when an integer type of elements in a matrix to be input is INT8 (integer, integer), it is required that the $1^{st}$ matrix of two matrices to be subjected to multiplication be arranged in row-major order and that the $2^{nd}$ matrix of the two matrices be arranged in column-major order.

In actual application, there are various arrangement methods for an input matrix. In this case, the GPU can further perform matrix multiplication operations on the input matrix only by changing an arrangement method of the input matrix to a preset one. In the prior art, when used for matrix multiplication operations, the GPU can perform transformation processing only on a matrix with elements whose integer type corresponds to a specific number of bits, resulting in low applicability of the GPU for matrix multiplication operations in the prior art.

SUMMARY

This application provides a data processing method and apparatus applied to a graphics processing unit, an electronic device, and a storage medium, to improve applicability of the GPU for matrix multiplication operations.

This application provides a data processing method applied to a graphics processing unit (GPU), including:

reading a to-be-processed matrix from memory corresponding to a target GPU into registers in a target streaming multiprocessor, where the target streaming multiprocessor is a streaming multiprocessor adapted to perform a matrix computation on the to-be-processed matrix;

in a process of reading the to-be-processed matrix from the registers into shared memory corresponding to the registers, performing a first preset operation on the to-be-processed matrix to obtain an initial matrix corresponding to the to-be-processed matrix; and in a process of reading the initial matrix from the shared memory into the registers, performing a second preset operation on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

Optionally, the reading a to-be-processed matrix from memory corresponding to a target GPU into registers in a target streaming multiprocessor includes:

obtaining a first number of times that a number of bits of the register is as much as a number of bits corresponding to an integer type of elements in the to-be-processed matrix; and starting from the first column, reading every the first number of times of elements in a same row in the to-be-processed matrix into the registers in turn based on the first number of times.

Optionally, the obtaining a first number of times that a number of bits of the register is as much as a number of bits corresponding to an integer type of elements in the to-be-processed matrix includes:

obtaining the number of bits of the register;

obtaining the number of bits corresponding to the integer type of elements in the to-be-processed matrix; and determining the first number of times based on the number of bits of the register and the number of bits corresponding to the integer type of elements in the to-be-processed matrix.

Optionally, the performing a first preset operation on the to-be-processed matrix to obtain an initial matrix corresponding to the to-be-processed matrix includes:

obtaining a first read-in instruction specific to the to-be-processed matrix, where the first read-in instruction is specific to a first integer type;

obtaining a second number of times that a number of bits corresponding to the first integer type is as much as a number of bits corresponding to an integer type of elements in the to-be-processed matrix;

determining the first preset operation specific to the to-be-processed matrix based on the second number of times, where the first preset operation is: starting from the first row, arranging elements in every the second number of times of rows in the matrix alternately in turn to combine into one row; and starting from the first row, arranging elements in every the second number of times of rows in the to-be-processed matrix alternately in turn to combine into one row, and reading the resulting rows into the shared memory to obtain the initial matrix.

Optionally, the second number of times is 2; and the starting from the first row, arranging elements in every the second number of times of rows in the to-be-processed matrix alternately in turn to combine into one row, and reading the resulting rows into the shared memory to obtain the initial matrix includes: starting from the first row, arranging elements in every two rows in the to-be-processed matrix alternately in turn to combine into one row, and reading the resulting rows into the shared memory to obtain the initial matrix.

Optionally, the second number of times is 2, including that the number of bits corresponding to the first integer type is 16 and the number of bits corresponding to the integer type of elements in the to-be-processed matrix is 8; or the number of bits corresponding to the first integer type is 32 and the number of bits corresponding to the integer type of elements in the to-be-processed matrix is 16.

Optionally, the second number of times is 1; and the starting from the first row, arranging elements in every the second number of times of rows in the to-be-processed matrix alternately in turn to combine into one row, and reading the resulting rows into the shared memory to obtain the initial matrix includes: starting from the first row, arranging elements in every one row in the to-be-processed matrix alternately in turn to combine into one row, and reading the resulting rows into the shared memory to obtain the initial matrix.

Optionally, the performing a second preset operation on the initial matrix to obtain a target matrix meeting a matrix multiplication operation requirement of the target GPU includes:

obtaining a second read-in instruction specific to the initial matrix, where the second read-in instruction carries a second integer type that the second read-in instruction is specific to;

obtaining a third number of times that a number of bits corresponding to the second integer type is as much as a number of bits corresponding to an integer type of elements in the initial matrix;

determining the second preset operation specific to the initial matrix based on the third number of times, where the second preset operation is: starting from the first column, performing a transposition on the matrix by taking every the third number of times of columns in the matrix as one column to obtain a target matrix, and reading the target matrix into the registers, and starting from the first column, performing a transposition on the initial matrix by taking every the third number of times of columns in the initial matrix as one column to obtain the target matrix, and reading the target matrix into the registers.

Optionally, the third number of times is 2; and the starting from the first column, performing a transposition on the initial matrix by taking every the third number of times of columns in the initial matrix as one column to obtain the target matrix, and reading the target matrix into the registers includes: starting from the first column, performing a transposition on the initial matrix by taking every two columns in the initial matrix as one column to obtain the target matrix, and reading the target matrix into the registers.

Optionally, the third number of times is 2, including that the number of bits corresponding to the third integer type is 16 and the number of bits corresponding to the integer type of elements in the initial matrix is 8; or the number of bits corresponding to the third integer type is 32 and the number of bits corresponding to the integer type of elements in the initial matrix is 16.

Optionally, a number of rows and a number of columns of the to-be-processed matrix are both 2 to the power of a natural number.

Optionally, the to-be-processed matrix includes at least one of a first matrix arranged in column-major order and a second matrix arranged in row-major order, and the first matrix and the second matrix are respectively the $1^{st}$ and the $2^{nd}$ matrices of two matrices to be subjected to a matrix multiplication operation.

Another aspect of this application further provides a data processing apparatus, applied to a GPU, where the apparatus includes:

a to-be-processed matrix reading unit adapted to read a to-be-processed matrix from memory corresponding to a target GPU into registers in a target streaming multiprocessor, where the target streaming multiprocessor is a streaming multiprocessor adapted to perform a matrix computation on the to-be-processed matrix;

a first preset operation execution unit adapted to: in a process of reading the to-be-processed matrix from the registers into shared memory corresponding to the registers, perform a first preset operation on the to-be-processed matrix to obtain an initial matrix corresponding to the to-be-processed matrix; and a second preset operation execution unit, adapted to: in a process of reading the initial matrix from the shared memory into the registers, perform a second preset operation on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

Another aspect of this application further provides an electronic device, applied to a GPU, including:

a processor; and a memory adapted to store a program of a text recognition method, where after being electrified, the device performs the following steps via the program of a data processing method applied to a GPU:

reading a to-be-processed matrix from memory corresponding to a target GPU into registers in a target streaming multiprocessor, where the target streaming multiprocessor is a streaming multiprocessor adapted to perform a matrix computation on the to-be-processed matrix;

in a process of reading the to-be-processed matrix from the registers into shared memory corresponding to the registers, performing a first preset operation on the to-be-processed matrix to obtain an initial matrix corresponding to the to-be-processed matrix; and in a process of reading the initial matrix from the shared memory into the registers, performing a second preset operation on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

Another aspect of this application further provides a storage medium, applied to a GPU, where the storage medium stores a program of a data processing method applied to a GPU, and when the program is executed by a processor, the following steps are implemented:

reading a to-be-processed matrix from memory corresponding to a target GPU into registers in a target streaming multiprocessor, where the target streaming multiprocessor is a streaming multiprocessor adapted to perform a matrix computation on the to-be-processed matrix;

in a process of reading the to-be-processed matrix from the registers into shared memory corresponding to the registers, performing a first preset operation on the to-be-processed matrix to obtain an initial matrix corresponding to the to-be-processed matrix; and in a process of reading the initial matrix from the shared memory into the registers, performing a second preset operation on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

Another aspect of this application further provides a data processing method applied to a GPU, including:

obtaining a to-be-processed matrix to be subjected to a matrix multiplication operation, where the to-be-processed matrix includes at least one of a first matrix arranged in column-major order and a second matrix arranged in row-major order, and the first matrix and the second matrix are respectively the 1st and the 2nd matrices of two matrices to be subjected to a matrix multiplication operation;

reading the to-be-processed matrix from memory corresponding to a target GPU into registers in a target streaming multiprocessor, where the target streaming multiprocessor is a streaming multiprocessor adapted to perform a matrix computation on the to-be-processed matrix;

in a process of reading the to-be-processed matrix from the registers into shared memory corresponding to the registers, performing a first preset operation on the to-be-processed matrix to obtain an initial matrix corresponding to the to-be-processed matrix;

in a process of reading the initial matrix from the shared memory into the registers, performing a second preset operation on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor; and performing a matrix multiplication operation on the target matrix by using the computation unit dedicated to matrix multiplication.

Another aspect of this application further provides a data processing apparatus comprising:

a to-be-processed matrix reading unit adapted to read a to-be-processed matrix from memory corresponding to a target computation unit into register of the target computation unit;

a first preset operation execution unit adapted to: in a process of reading the to-be-processed matrix from the registers into shared memory corresponding to the registers, perform a first preset operation on the to-be-processed matrix to obtain an initial matrix corresponding to the to-be-processed matrix; and a second preset operation execution unit, adapted to: in a process of reading the initial matrix from the shared memory into the registers, perform a second preset operation on the initial matrix to obtain a target matrix meeting a matrix multiplication operation requirement of the target computation unit dedicated to matrix-related operations.

Optionally, the target computation unit is adapted to compute a matrix multiplication operation on the target matrix.

Optionally, wherein reading the to-be-processed matrix into the registers of the target computation unit comprises:

obtaining a first number of times that a number of bits of the register is as much as a number of bits corresponding to an integer type of elements in the to-be-processed matrix; and starting from the first column, reading every the first number of times of elements in a same row in the to-be-processed matrix into the registers in turn based on the first number of times.

Optionally, wherein performing the first preset operation comprises:

obtaining a second number of times that a number of bits corresponding to the first integer type is as much as a number of bits corresponding to an integer type of elements in the to-be-processed matrix; and starting from the first row, arranging elements in every the second number of times of rows in the to-be-processed matrix alternately in turn to combine into one row to obtain the initial matrix.

Optionally, wherein performing the second present operation comprises:

obtaining a third number of times that a number of bits corresponding to s second integer type is as much as a number of bits corresponding to an integer type of elements in the initial matrix; and starting from the first column, performing a transposition on the initial matrix by taking every the third number of times of columns in the initial matrix as one column to obtain the target matrix.

Another aspect of this application further provides a data processing method comprising:

obtaining a to-be-processed matrix including at least one of a first matrix arranged in column-major order and a second matrix arranged in row-major order;

reading the to-be-processed matrix from memory into registers in a target computation unit;

in a process of reading the to-be-processed matrix from the registers into shared memory corresponding to the registers of the target computation unit, performing a first preset operation on the to-be-processed matrix to obtain an initial matrix corresponding to the to-be-processed matrix;

in a process of reading the initial matrix from the shared memory into the registers of the target computation unit, performing a second preset operation on the initial matrix to obtain a target matrix meeting a matrix multiplication operation requirement of the target computation unit; and performing a matrix multiplication operation on the target matrix by using the target computation unit.

Optionally, reading the to-be-processed matrix from memory into the registers includes:

obtaining a first number of times that a number of bits of the register is as much as a number of bits corresponding to an integer type of elements in the to-be-processed matrix; and starting from the first column, reading every the first number of times of elements in a same row in the to-be-processed matrix into the registers in turn based on the first number of times;

performing the first preset operation includes:

obtaining a second number of times that a number of bits corresponding to the first integer type is as much as a number of bits corresponding to an integer type of elements in the to-be-processed matrix; and starting from the first row, arranging elements in every the second number of times of rows in the to-beprocessed matrix alternately in turn to combine into one row to obtain the initial matrix; and performing the second preset operation includes:

obtaining a third number of times that a number of bits corresponding to s second integer type is as much as a number of bits corresponding to an integer type of elements in the initial matrix; and starting from the first column, performing a transposition on the initial matrix by taking every the third number of times of columns in the initial matrix as one column to obtain the target matrix.

Optionally, obtaining a first number of times that a number of bits of the register is as much as a number of bits corresponding to an integer type of elements in the to-be-processed matrix includes:

obtaining the number of bits of the register;

obtaining the number of bits corresponding to the integer type of elements in the to-be-processed matrix; and determining the first number of times based on the number of bits of the register and the number of bits corresponding to the integer type of elements in the to-be-processed matrix.

Compared with the prior art, this application has the following advantages:

In the data processing method applied to a graphics processing unit (GPU) provided in this application, first, a to-be-processed matrix is read from memory corresponding to a target GPU into registers in a target streaming multiprocessor, where the target streaming multiprocessor is a streaming multiprocessor adapted to perform a matrix computation on the to-be-processed matrix; then, in a process of reading the to-be-processed matrix from the registers into shared memory corresponding to the registers, a first preset operation is performed on the to-be-processed matrix to obtain an initial matrix corresponding to the to-be-processed matrix; and finally, in a process of reading the initial matrix from the shared memory into the registers, a second preset operation is performed on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor. According to the data processing method applied to a graphics processing unit (GPU) provided in this application, two different preset operations are performed in turn on a to-be-processed matrix that does not meet a matrix multiplication operation requirement of the GPU, so as to transform the to-be-processed matrix into a target matrix that meets a matrix multiplication operation requirement of a computation unit dedicated to matrix multiplication, thereby improving applicability of the GPU for matrix multiplication operations.

BRIEF DESCRIPTION OF DRAWINGS

FIG. 2 is a flowchart of the data processing method applied to a GPU according to the first embodiment of this application;

DESCRIPTION OF EMBODIMENTS

In the following descriptions, many specific details are provided to help thoroughly understand this application. However, this application can be implemented in many other manners different from those described herein. A person skilled in the art can make similar expansions without departing from the connotation of this application. Therefore, this application is not limited by the specific embodiments disclosed below.

First Embodiment

Figure 1:
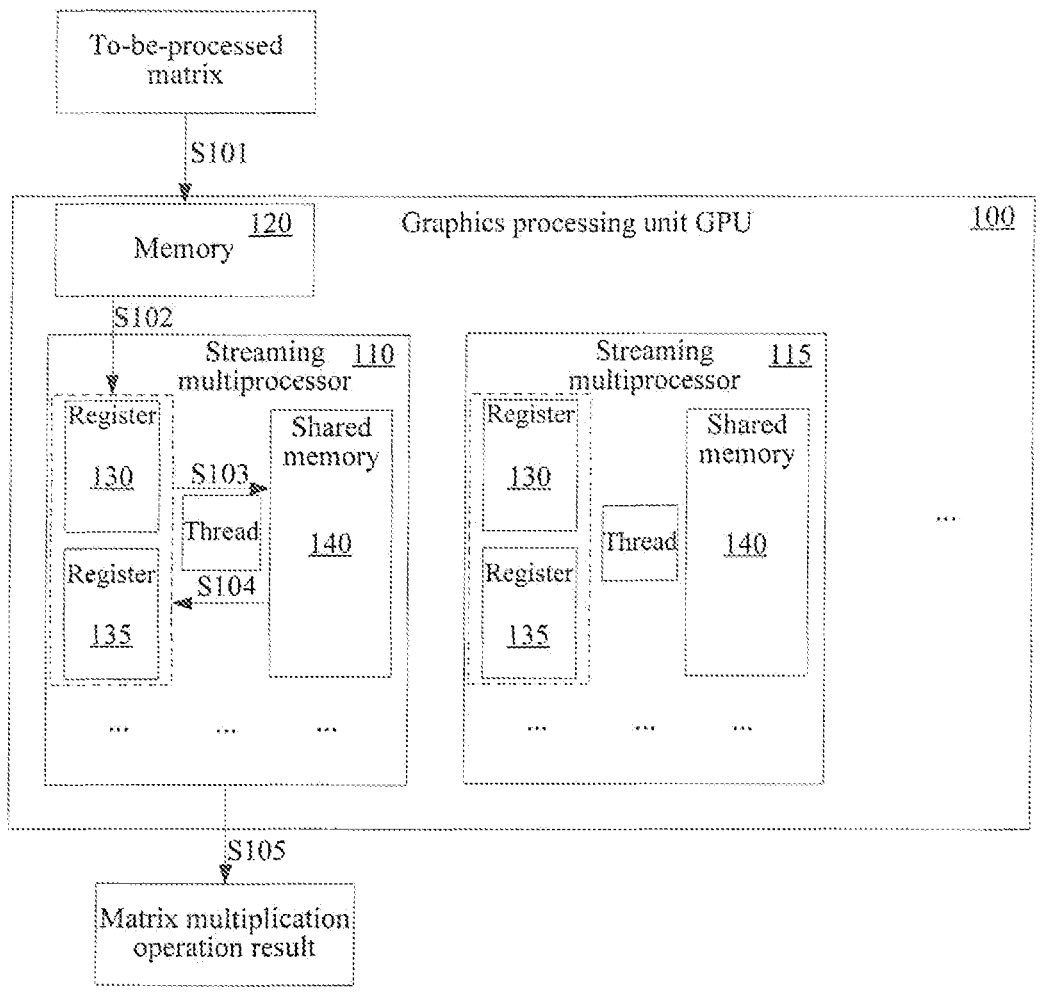
FIG. 1 is a schematic diagram of a scenario of a data processing method applied to a GPU according to a first embodiment of this application.

To describe a data processing method applied to a GPU according to an embodiment of this application more clearly, an application scenario of the data processing method applied to a GPU according to the first embodiment of this application is first described. Referring to FIG. 1, a schematic diagram of a scenario of the data processing method applied to a computing system according to the first embodiment of this application is shown. The computing system 100 can include one or more computation units 110, 115, and one or more memories 120. In one implementation, the computing system can be a GPU and the one or more computation units can be streaming multiprocessors. Each computation unit 110, 115 can include a plurality of registers 130, 135 and a shared memory 140.

In actual application of the data processing method applied to a computing system such as a GPU according to the first embodiment of this application, for performing a matrix multiplication operation on a matrix, the following steps are sequentially implemented: step S101: inputting a to-be-processed matrix into memory corresponding to a target GPU; step S102: reading the to-be-processed matrix from the memory corresponding to the target GPU into registers in a target streaming multiprocessor; step S103: in a process of reading the to-be-processed matrix from the registers into shared memory corresponding to the registers, performing a first preset operation on the to-be-processed matrix to obtain an initial matrix corresponding to the to-be-processed matrix; step S104: in a process of reading the initial matrix from the shared memory into the registers, performing a second preset operation on the initial matrix to obtain a target matrix meeting a matrix multiplication operation requirement of a computation unit dedicated to matrix multiplication; and step S105: performing a matrix multiplication operation on the target matrix. The computation unit dedicated to matrix multiplication is a computation unit dedicated to matrix-related operations in the target streaming multiprocessor.

The to-be-processed matrix is a first matrix arranged in column-major order and a second matrix arranged in row-major order, or a first matrix arranged in row-major order and a second matrix arranged in column-major order. The first matrix and the second matrix are respectively the $1^{st}$ and the $2^{nd}$ matrices of two matrices to be subjected to a matrix multiplication operation.

The target matrix is a target matrix that meets a matrix multiplication operation requirement of a computation unit dedicated to matrix multiplication. The matrix multiplication operation requirement of the computation unit dedicated to matrix multiplication is pre-determined based on hardware conditions of the target GPU. For example, when an integer type of elements in a matrix to be input is INT8, it is required that the $1^{st}$ matrix of two matrices to be subjected to multiplication be arranged in row-major order and that the $2^{nd}$ matrix of the two matrices be arranged in column-major order. In this case, the matrix multiplication operation requirement of the computation unit dedicated to matrix multiplication is that a first matrix of two matrices to be subjected to multiplication is arranged in row-major order and a second matrix of the two matrices is arranged in column-major order.

For better understanding the data processing method applied to a GPU according to the first embodiment of this application, concepts related to GPU and integer type involved in the first embodiment of this application are described before a specific execution method of the data processing method applied to a GPU according to the first embodiment of this application is described.

Concepts related to GPU involved in the first embodiment of this application are as follows: The target streaming multiprocessor (Streaming Multiprocessor, SM) is a computation unit used for matrix-related operations in a GPU. When performing tasks, the GPU checks, in a polling manner via a task allocation unit, whether an SM has sufficient resources to perform a new task. If yes, the GPU allocates a new task to the SM. If not, the GPU checks a next SM. Factors that determine whether a new task can be allocated to an SM are: memory space of shared memory for use by each task, a number of registers for use by each task, and other limiting conditions.

When performing an allocated task, an SM schedules threads via a warp (warp) to execute same instructions at a time. Generally, each warp includes 32 threads. During specific implementation, based on the design of GPU, each warp can schedule a preset number of threads at a time to execute same instructions. For a currently common GPU, each warp may first schedule 16 threads at a time to execute same instructions, and after the execution by the first 16 threads is completed, the warp then schedules another 16 threads to execute same instructions. In the first embodiment of this application, a preset number of threads that can be scheduled at a time by each warp is not specifically limited. In addition, generally, each warp may alternatively include 64 treads. The number of threads included by each warp is not limited in the first embodiment of this application. When specific execution steps of the data processing method applied to a GPU according to the first embodiment of this application are described, the first embodiment of this application is described in detail by using an example in which each warp includes 32 threads. Generally, each thread corresponds to one register, or may use a plurality of registers. In addition, a plurality of warps share one piece of shared memory. A register is a high-speed on-chip cache of a GPU. The register is 32 bits (binary digit, binary unit) wide. In other words, the register can store a file with a size of 32 bits. Specifically, registers and shared memory are generally resources for SMs. Assuming that one SM has 65536 registers and that 1024 threads run on one SM, one thread can use 64 registers. In addition, for different types of GPUs, a preset number of registers that can be used by a single thread is limited.

A number of bits corresponding to an integer type refers to a number of binary digits in its representation. For example, int8 refers to an integer of 8 binary digits. For another example, int16 refers to an integer of 16 binary digits.

The data processing method applied to a GPU according to the first embodiment of this application is described below with reference to FIG. 2.

FIG. 2 is a flowchart of the data processing method applied to a GPU according to the first embodiment of this application. The data processing method applied to a GPU shown in FIG. 2 includes steps S201 to S203.

In step S201, a to-be-processed matrix is read from memory corresponding to a target GPU into registers in a target streaming multiprocessor, where the target streaming multiprocessor is a streaming multiprocessor adapted to perform a matrix computation on the to-be-processed matrix.

The target streaming multiprocessor is a streaming multiprocessor adapted to perform a matrix computation on the to-be-processed matrix.

In the first embodiment of this application, the to-be-processed matrix is a first matrix arranged in column-major order and/or a second matrix arranged in row-major order. A number of rows and a number of columns of the to-be-processed matrix are both 2 to the power of a natural number. In two matrices to be subjected to a matrix multiplication operation, a number of columns in a first matrix needs to be equal to a number of rows in a second matrix. For example, the first matrix is a matrix with 8 rows and 16 columns, and the second matrix is a matrix with 16 rows and 8 columns. For a matrix arranged in row-major order, elements in each row in the matrix are contiguously arranged in memory. For a matrix arranged in column-major order, elements in each column in the matrix are contiguously arranged in memory.

Figure 3:
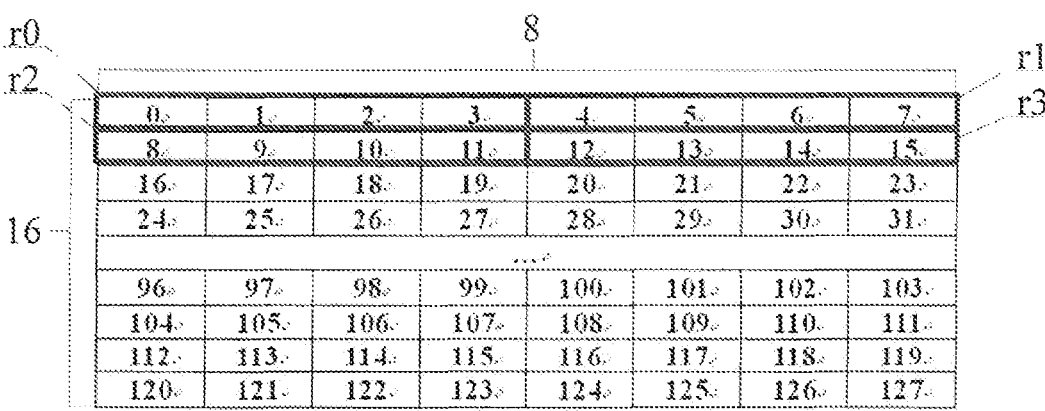
FIG. 3 is a schematic diagram of a processing process of a to-be-processed matrix according to the first embodiment of this application.

When the target GPU is used to perform a matrix multiplication operation, a matrix to be subjected to the operation needs to be first input into memory corresponding to the target GPU. In the first embodiment of this application, if two matrices to be subjected to a matrix multiplication operation include a to-be-processed matrix, in a process of performing the matrix multiplication operation, the to-be-processed matrix needs to be first read from memory corresponding to the target GPU into registers in a target streaming multiprocessor. For a specific execution process, refer to FIG. 3. FIG. 3 is a schematic diagram of a processing process of a to-be-processed matrix according to the first embodiment of this application.

A specific implementation of reading the to-be-processed matrix from memory corresponding to the target GPU into registers in a target streaming multiprocessor is: first obtaining a first number of times that a number of bits of the register is as much as a number of bits corresponding to an integer type of elements in the to-be-processed matrix; and then starting from the first column, reading every the first number of times of elements in a same row in the to-be-processed matrix into the registers in turn based on the first number of times.

In the first embodiment of this application, before the first number of times is obtained, the number of bits of the register and the number of bits corresponding to the integer type of elements in the to-be-processed matrix need to be first obtained, and then the first number of times is determined based on the number of bits of the register and the number of bits corresponding to the integer type of elements in the to-be-processed matrix. A specific implementation of reading the to-be-processed matrix from memory corresponding to the target GPU into registers in a target streaming multiprocessor is described by using an example in which the number of bits corresponding to the matrix, or the number of rows and the number of columns in the matrix are not further described herein.

Because the number of bits of the register is 32, and the number of bits corresponding to the integer type of elements in the to-be-processed matrix is 8, in this case, the first number of times that the number of bits of the register is as much as the number of bits corresponding to the integer type of elements in the to-be-processed matrix is 32 bit/8 bit-4. In other words, four elements can be read into the register. In a process of reading the to-be-processed matrix from the memory corresponding to the target GPU into the registers in the target streaming multiprocessor, every four elements in a same row in the to-be-processed matrix need to be read into the registers in turn, starting from the first column. As shown in FIG. 3, elements in the first four columns in row 0 in the to-be-processed matrix with 16 rows and 8 columns are read into register r0, elements in the last four columns in row 0 are read into register r1, elements in the first four columns in row 1 in the to-be-processed matrix with 16 rows and 8 columns are read into register r2, and elements in the last four columns in row 1 are read into register r3, . . . , until all elements in the matrix with 16 rows and 8 columns are respectively read into registers.

Referring to FIG. 2 again, in step S202, in a process of reading the to-be-processed matrix from the registers into shared memory corresponding to the registers, a first preset operation is performed on the to-be-processed matrix to obtain an initial matrix corresponding to the to-be-processed matrix.

The first preset operation is: starting from the first row, arranging elements in every the second number of times of rows in the matrix alternately in turn to combine into one row. The second number of times is a number of times that a number of bits corresponding to a first integer type is as much as the number of bits corresponding to the integer type of elements in the to-be-processed matrix.

In the first embodiment of this application, a specific process of performing a first preset operation on the to-be-processed matrix to obtain an initial matrix corresponding to the to-be-processed matrix is: first, obtaining a first read-in instruction specific to the to-be-processed matrix, where the first read-in instruction is specific to a first integer type; next, obtaining a second number of times that a number of bits corresponding to the first integer type is as much as a number of bits corresponding to an integer type of elements in the to-be-processed matrix; then, determining the first preset operation specific to the to-be-processed matrix based on the second number of times; and finally, starting from the first row, arranging elements in every the second number of times of rows in the to-be-processed matrix alternately in turn to combine into one row, and reading the resulting rows into the shared memory to obtain the initial matrix.

The first read-in instruction is specifically a prmt instruction. The prmt instruction has two input registers, one output register, and an index (index). Four bytes of data can be extracted from a total of eight bytes of data in the two input registers according to the index and placed in the output register. A format of the instruction may be: prmt.b32d,a,b, index, where d denotes a 32-bit output register, a and b both denote a 32-bit input register, index denotes a 32-bit register composed of data of four int8s. The four bytes in register a are numbered in ascending order of significance as 0, 1, 2, 3, and the four bytes in register b are numbered in ascending order of significance as 4, 5, 6, 7. Assuming that the index is 0x5140 (that is, four int8s included in index are respectively 5, 1, 4, 0), data included in the output register d includes byte 0 in register a, byte 4 in register b, byte 1 in register a, and byte 5 in register b, respectively in ascending order of significance. In the first embodiment of this application, the prmt instruction may be specifically prmt.b32 regd,r0,r2.

Figure 4:
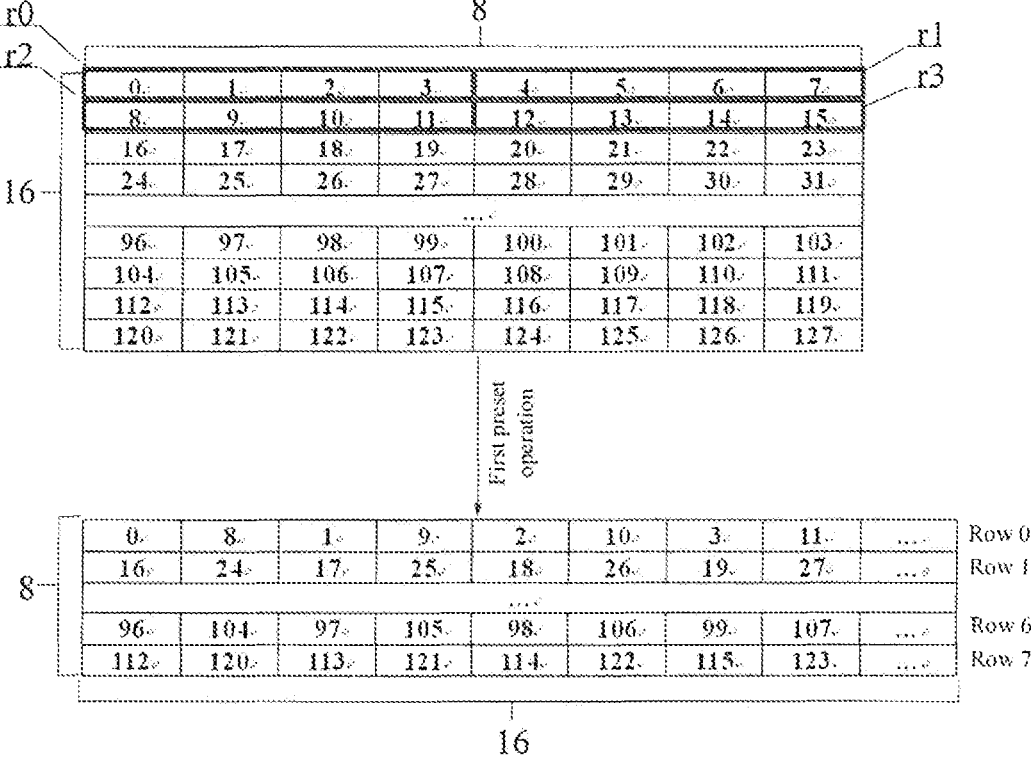
FIG. 4 is a schematic diagram of a processing process of an initial matrix according to the first embodiment of this application.

The second number of times may be 2. Generally, the number of bits corresponding to the first integer type is 16, and the number of bits corresponding to the integer type of elements in the to-be-processed matrix is 8; or the number of bits corresponding to the first integer type is 32, and the number of bits corresponding to the integer type of elements in the to-be-processed matrix is 16. A specific process of obtaining an initial matrix corresponding to the to-be-processed matrix is described below in detail by using an example in which the number of bits corresponding to the integer type of elements in the to-be-processed matrix is 8, the matrix is a second matrix with 16 rows and 8 columns arranged in row-major order, the number of bits corresponding to the first integer type is 16, and the number of bits of the register is 32. Referring to FIG. 4, FIG. 4 is a schematic diagram of a processing process of an initial matrix according to the first embodiment of this application. In this case, the element (0) in the first column of r0 is used as an element in the first column of row 0 in a combined matrix, the element (8) in the first column of r2 is used as an element in the second column of row 0 in the combined matrix, the element (1) in the second column of r0 is used as an element in the third column of row 0 in the combined matrix, and the element (9) in the second column of r2 is used as an element in the fourth column of row 0 in the combined matrix, . . . , with corresponding steps performed in turn until all elements in the to-be-processed matrix are read from the registers into the shared memory corresponding to the registers. Correspondingly, the elements starting from the first column of row 0 in the combined matrix are sequentially 0, 8, 1, 9, 2, 10, 3, 11, . . . , the elements starting from the first column of row 1 in the combined matrix are sequentially 16, 24, 17, 25, 18, 26, 19, 27 . . . , the elements starting from the first column of row 2 in the combined matrix are sequentially . . . , the elements starting from the first column of row 7 in the combined matrix are sequentially 112, 120, 113, 121, 114, 122, 115, 123, . . . .

In addition, the second number of times may alternatively be 1. In this case, a specific implementation process of starting from the first row, arranging elements in every the second number of times of rows in the to-be-processed matrix alternately in turn to combine into one row, and reading the resulting rows into the shared memory to obtain the initial matrix is: starting from the first row, arranging elements in every one row in the to-be-processed matrix alternately in turn to combine into one row, and reading the resulting rows into the shared memory to obtain the initial matrix.

Referring to FIG. 2 again, in step S203, in a process of reading the initial matrix from the shared memory into the registers, a second preset operation is performed on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

The second preset operation is: starting from the first column, performing a transposition on the matrix by taking every the third number of times of columns in the matrix as one column to obtain a target matrix, and reading the target matrix into the registers. The third number of times is a number of times that the number of bits corresponding to a second integer type is as much as a number of bits corresponding to an integer type of elements in the initial matrix.

In the first embodiment of this application, a specific process of performing a second preset operation on the initial matrix to obtain a target matrix meeting a matrix multiplication operation requirement of a computation unit dedicated to matrix multiplication is: first, obtaining a second read-in instruction specific to the initial matrix, where the second read-in instruction carries a second integer type that the second read-in instruction is specific to; next, obtaining a third number of times that a number of bits corresponding to the second integer type is as much as a number of bits corresponding to an integer type of elements in the initial matrix; then, determining the second preset operation specific to the to-be-processed matrix based on the third number of times; and finally, starting from the first column, performing a transposition on the initial matrix by taking every the third number of times of columns in the initial matrix as one column to obtain the target matrix, and reading the target matrix into the registers.

The second read-in instruction is specifically a ldmatrix instruction, and the ldmatrix instruction is used for reading matrix blocks from the shared memory into the registers. For a unit dedicated to matrix computation, a matrix-related operation is performed by all of one warp. Therefore, before a matrix-related operation is performed, all threads of a warp need to read data of the matrix into the registers. One ldmatrix can read one, two, or four matrices into the registers at a time. If one matrix is to be read, threads 0 to 7 in the warp transfer an initial address of eight rows of data in the matrix to the ldmatrix instruction, and the register line0 for threads 8 to 31 is ignored. If four matrices are to be read, threads 0 to 7 in the warp inputs an initial address of eight rows of data in the first matrix into ldmatrix, threads 8 to 15 inputs an initial address of eight rows of data in the second matrix, and threads 16 to 23 and 24 to 31 respectively input initial addresses of eight rows of data in the third matrix and eight rows of data in the fourth matrix to ldmatrix. A format of the instruction may be as follows: ldmatrix.sync.aligned.m8n8*1.trans.shared.b16redm(line0). Specifically, if the initial matrix has 8 rows and 16 columns, thread 0 of a warp is responsible for reading four numbers in columns 0 to 3 of row 0 into a register, thread 1 is responsible for reading four numbers in columns 4 to 7 of row 0 into a register, and thread 4 is responsible for reading four numbers in columns 0 to 3 of row 1 into a register. After the reading is complete, data of 32 threads in the warp are combined to constitute a target matrix with 8 rows and 16 columns.

The third number of times is 2. Generally, the number of bits corresponding to the second integer type is 16, and the number of bits corresponding to the integer type of elements in the initial matrix is 8; or the number of bits corresponding to the second integer type is 32, and the number of bits corresponding to the integer type of elements in the initial matrix is 16. In this case, a specific implementation of starting from the first column, performing a transposition on the initial matrix by taking every the third number of times of columns in the to-be-processed matrix as one column to obtain the target matrix, and reading the target matrix into the registers is: starting from the first column, performing a transposition on the to-be-processed matrix by taking every two columns in the initial matrix as one column to obtain the target matrix, and reading the target matrix into the registers.

Figures 5, 6:
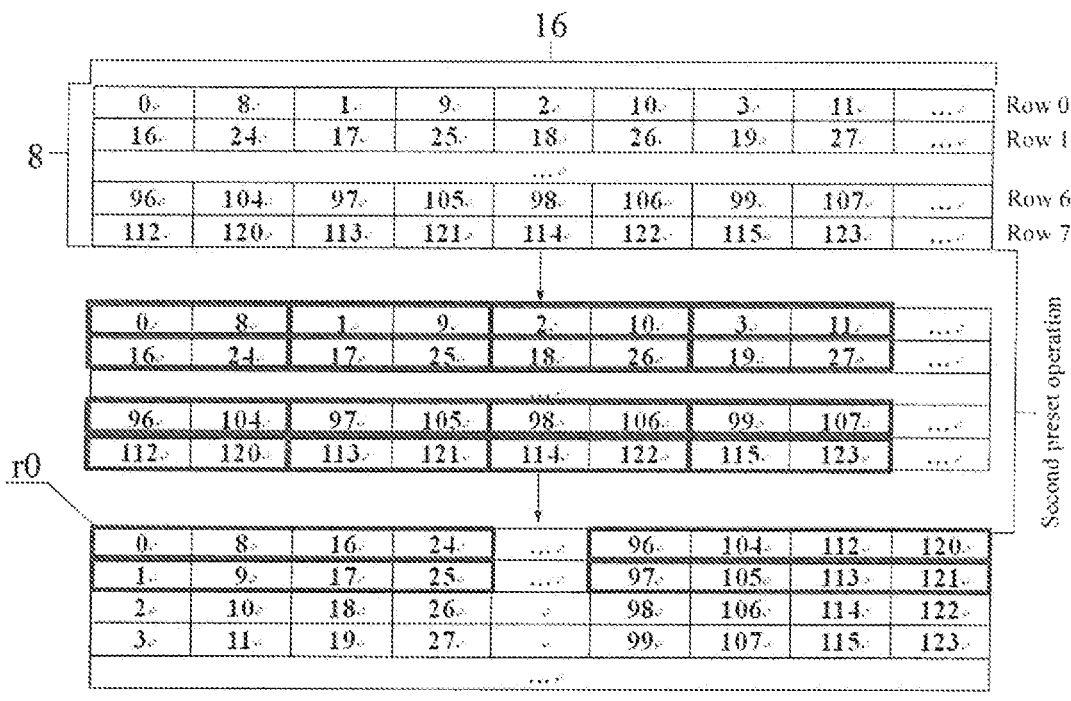
FIG. 5 is a schematic diagram of a processing process of a target matrix according to the first embodiment of this application.
FIG. 6 is a schematic diagram of a data processing apparatus according to a second embodiment of this application.

A specific process of obtaining a target matrix meeting a matrix multiplication operation requirement of a computation unit dedicated to matrix multiplication is described below in detail by using an example in which the number of bits corresponding to the integer type of elements in the initial matrix is 8, the matrix is a second matrix with 16 rows and 8 columns arranged in row-major order, the number of bits corresponding to the second integer type is 16, and the number of bits of the register is 32. Referring to FIG. 5, FIG. 5 is a schematic diagram of a processing process of a target matrix according to the first embodiment of this application. A transposition is performed by taking the first column and the second column of row 0 in the initial matrix as the first column of row 0 in the target matrix, the third column and the fourth column of row 0 in the initial matrix as the second column of row 0 in the target matrix, the fifth column and the sixth column of row 0 of the initial matrix as the third column of row 0 in the target matrix, and the seventh column and the eighth column of row 0 in the initial matrix as the fourth column of row 0 in the target matrix, . . . , in which case, in the target matrix, elements in the first column of row 0 are (0, 8), (16, 24), . . . , those in the first column of row 1 are (1, 9), . . . , (17, 25), . . . , those in the first column of row 2 are (2, 10), (18, 26), . . . , and those in the first column of row 3 are (3, 11), (19, 27), . . . .

After the transposition on the initial matrix is completed, the transposed initial matrix is read into the registers to obtain the target matrix. For details about a specific implementation process of reading the transposed initial matrix into the registers, refer to the process of reading a target matrix from memory corresponding to a target GPU into registers in a target streaming multiprocessor in step S201, which is not described herein again. In the first embodiment of this application, distribution of the target matrix after the target matrix is read from the memory corresponding to the target GPU into the registers in the target streaming multiprocessor is: elements (0, 8, 16, 24) in the first four columns of row 0 are read into register r0, elements (32, 40, 48, 56) in the columns 4 to 8 of row 0 are read into register r1, elements (64, 72, 80, 88) in the first four columns in row 1 are read into register r2, and elements (96, 104, 112, 120) in columns 4 to 8 in row 1 are read into register r3, . . . , until all elements in the target matrix are respectively read into the registers.

In the first embodiment of this application, after the target matrix is read into the registers, the SM can schedule a warp to perform a multiplication operation on the target matrix.

In the data processing method applied to a graphics processing unit (GPU) provided in the first embodiment of this application, first, a to-be-processed matrix is read from memory corresponding to a target GPU into registers in a target streaming multiprocessor, where the target streaming multiprocessor is a streaming multiprocessor adapted to perform a matrix computation on the to-be-processed matrix; then, in a process of reading the to-be-processed matrix from the registers into shared memory corresponding to the registers, a first preset operation is performed on the to-be-processed matrix to obtain an initial matrix corresponding to the to-be-processed matrix; and finally, in a process of reading the initial matrix from the shared memory into the registers, a second preset operation is performed on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target stream- ing multiprocessor. According to the data processing method applied to a graphics processing unit (GPU) provided in the first embodiment of this application, two different preset operations are performed in turn on a to-be-processed matrix that does not meet a matrix multiplication operation require- ment of the GPU, so as to transform the to-be-processed matrix into a target matrix that meets a matrix multiplication operation requirement of a computation unit dedicated to matrix multiplication, thereby improving applicability of the GPU for matrix multiplication operations.

Second Embodiment

In correspondence to the data processing method applied to a GPU according to the first embodiment of this appli- cation, a second embodiment of this application further provides a data processing apparatus, where the apparatus is applied to a GPU. The apparatus embodiment is essentially similar to the first embodiment. Therefore, descriptions of this embodiment are relatively simple. For related content, refer to part of descriptions of the first embodiment. The apparatus embodiment described below is merely illustra- tive.

Referring to FIG. 6, FIG. 6 is a schematic diagram of a data processing apparatus according to the second embodi- ment of this application.

The data processing apparatus according to the second embodiment of this application includes:

a to-be-processed matrix reading unit 601 adapted to read a to-be-processed matrix from memory corresponding to a target GPU into registers in a target streaming multiprocessor, where the target streaming multipro- cessor is a streaming multiprocessor adapted to perform a matrix computation on the to-be-processed matrix;

a first preset operation execution unit 602 adapted to: in a process of reading the to-be-processed matrix from the registers into shared memory corresponding to the registers, perform a first preset operation on the to-be- processed matrix to obtain an initial matrix correspond- ing to the to-be-processed matrix; and a second preset operation execution unit 603, adapted to: in a process of reading the initial matrix from the shared memory into the registers, perform a second preset operation on the initial matrix to obtain a target matrix meeting a matrix multiplication operation requirement of a computation unit dedicated to matrix multiplica- tion, where the computation unit dedicated to matrix multiplication is a computation unit dedicated to matrix-related operations in the target streaming mul- tiprocessor.

Optionally, the to-be-processed matrix reading unit 601 is specifically adapted to: obtain a first number of times that a number of bits of the register is as much as a number of bits corresponding to an integer type of elements in the to-be- processed matrix; and starting from the first column, read every the first number of times of elements in a same row in the to-be-processed matrix into the registers in turn based on the first number of times.

Optionally, the obtaining a first number of times that a number of bits of the register is as much as a number of bits corresponding to an integer type of elements in the to-be- processed matrix includes:

obtaining the number of bits of the register;

obtaining the number of bits corresponding to the integer type of elements in the to-be-processed matrix; and determining the first number of times based on the num- ber of bits of the register and the number of bits corresponding to the integer type of elements in the to-be-processed matrix.

Optionally, the first preset operation execution unit 602 is specifically adapted to: obtain a first read-in instruction specific to the to-be-processed matrix, where the first read-in instruction is specific to a first integer type; obtain a second number of times that a number of bits corresponding to the first integer type is as much as a number of bits correspond- ing to an integer type of elements in the to-be-processed matrix; determine the first preset operation specific to the to-be-processed matrix based on the second number of times, where the first preset operation is: starting from the first row, arranging elements in every the second number of times of rows in the matrix alternately in turn to combine into one row; and starting from the first row, arranging elements in every the second number of times of rows in the to-be-processed matrix alternately in turn to combine into one row, and reading the resulting rows into the shared memory to obtain the initial matrix.

Optionally, the second number of times is 2; and the starting from the first row, arranging elements in every the second number of times of rows in the to-be- processed matrix alternately in turn to combine into one row, and reading the resulting rows into the shared memory to obtain the initial matrix includes: starting from the first row, arranging elements in every two rows in the to-be-processed matrix alternately in turn to combine into one row, and reading the resulting rows into the shared memory to obtain the initial matrix.

Optionally, the second number of times is 2, including that the number of bits corresponding to the first integer type is 16 and the number of bits corresponding to the integer type of elements in the to-be-processed matrix is 8; or the number of bits corresponding to the first integer type is 32 and the number of bits corresponding to the integer type of elements in the to-be-processed matrix is 16.

Optionally, the second number of times is 1; and the starting from the first row, arranging elements in every the second number of times of rows in the to-be- processed matrix alternately in turn to combine into one row, and reading the resulting rows into the shared memory to obtain the initial matrix includes: starting from the first row, arranging elements in every one row in the to-be-processed matrix alternately in turn to combine into one row, and reading the resulting rows into the shared memory to obtain the initial matrix.

Optionally, the second preset operation execution unit 603 is specifically adapted to: obtain a second read-in instruction specific to the initial matrix, where the second read-in instruction carries a second integer type that the second read-in instruction is specific to; obtain a third number of times that a number of bits corresponding to the second integer type is as much as a number of bits corresponding to an integer type of elements in the initial matrix; determine the second preset operation specific to the initial matrix based on the third number of times, where the second preset operation is: starting from the first column, performing a transposition on the matrix by taking every the third number of times of columns in the matrix as one column to obtain a target matrix, and reading the target matrix into the registers; and starting from the first column, performing a transposition on the initial matrix by taking every the third number of times of columns in the initial matrix as one column to obtain the target matrix, and reading the target matrix into the registers.

Optionally, the third number of times is 2; and the starting from the first column, perfuming a transposition on the initial matrix by taking every the third number of times of columns in the initial matrix as one column to obtain the target matrix, and reading the target matrix into the registers includes: starting from the first column, perfuming a transposition on the initial matrix by taking every two columns in the initial matrix as one column to obtain the target matrix, and reading the target matrix into the registers.

Optionally, the third number of times is 2, including that the number of bits corresponding to the third integer type is 16 and the number of bits corresponding to the integer type of elements in the initial matrix is 8; or the number of bits corresponding to the second integer type is 32 and the number of bits corresponding to the integer type of elements in the initial matrix is 16.

Optionally, a number of rows and a number of columns of the to-be-processed matrix are both 2 to the power of a natural number.

Optionally, the to-be-processed matrix includes at least one of a first matrix arranged in column-major order and a second matrix arranged in row-major order, and the first matrix and the second matrix are respectively the $1^{st}$ and the $2^{nd}$ matrices of two matrices to be subjected to a matrix multiplication operation.

Third Embodiment

In correspondence to the data processing method applied to a GPU according to the first embodiment of this application, a third embodiment of this application further provides an electronic device, applied to a GPU. The third embodiment is essentially similar to the first embodiment. Therefore, descriptions of this embodiment are relatively simple. For related content, refer to part of descriptions of the first embodiment. The third embodiment described below is merely illustrative.

Figure 7:
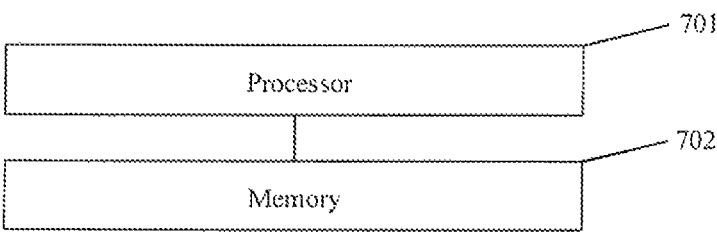
FIG. 7 is a schematic diagram of an electronic device according to a third embodiment of this application.

Referring to FIG. 7, FIG. 7 is a schematic diagram of an electronic device according to the third embodiment of this application.

The electronic device according to the third embodiment of this application includes:

a processor 710; and a memory 702 adapted to store a program of a text recognition method, where after being electrified, the device performs the following steps via the program of a data processing method applied to a GPU:

reading a to-be-processed matrix from memory corresponding to a target GPU into registers in a target streaming multiprocessor, where the target streaming multiprocessor is a streaming multiprocessor adapted to perform a matrix computation on the to-be-processed matrix;

in a process of reading the to-be-processed matrix from the registers into shared memory corresponding to the registers, performing a first preset operation on the to-be-processed matrix to obtain an initial matrix corresponding to the to-be-processed matrix; and in a process of reading the initial matrix from the shared memory into the registers, performing a second preset operation on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

It should be noted that, for detailed descriptions of the electronic device provided in the third embodiment of this application, reference may be made to related descriptions of the data processing method applied to a GPU provided in the first embodiment of this application, and details are not described herein again.

Fourth Embodiment

In correspondence to the data processing method applied to a GPU according to the first embodiment of this application, a fourth embodiment of this application further provides a storage medium, applied to a GPU. The fourth embodiment is essentially similar to the first embodiment. Therefore, descriptions of this embodiment are relatively simple. For related content, refer to part of descriptions of the first embodiment. The fourth embodiment described below is merely illustrative.

The storage medium provided in the fourth embodiment of this application stores a program of a data processing method applied to a GPU, and when the program is executed by a processor, the following steps are implemented:

reading a to-be-processed matrix from memory corresponding to a target GPU into registers in a target streaming multiprocessor, where the target streaming multiprocessor is a streaming multiprocessor adapted to perform a matrix computation on the to-be-processed matrix;

in a process of reading the to-be-processed matrix from the registers into shared memory corresponding to the registers, performing a first preset operation on the to-be-processed matrix to obtain an initial matrix corresponding to the to-be-processed matrix; and in a process of reading the initial matrix from the shared memory into the registers, performing a second preset operation on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

It should be noted that, for detailed descriptions of the storage medium provided in the fourth embodiment of this application, reference may be made to related descriptions of the data processing method applied to a GPU provided in the first embodiment of this application, and details are not described herein again.

Fifth Embodiment

In correspondence to the data processing method applied to a GPU according to the first embodiment of this application, a fifth embodiment of this application further provides another data processing method applied to a GPU. The fifth embodiment is essentially similar to the first embodiment. Therefore, descriptions of this embodiment are relatively simple. For related content, refer to part of descriptions of the first embodiment. The fifth embodiment described below is merely illustrative.

Figure 8:
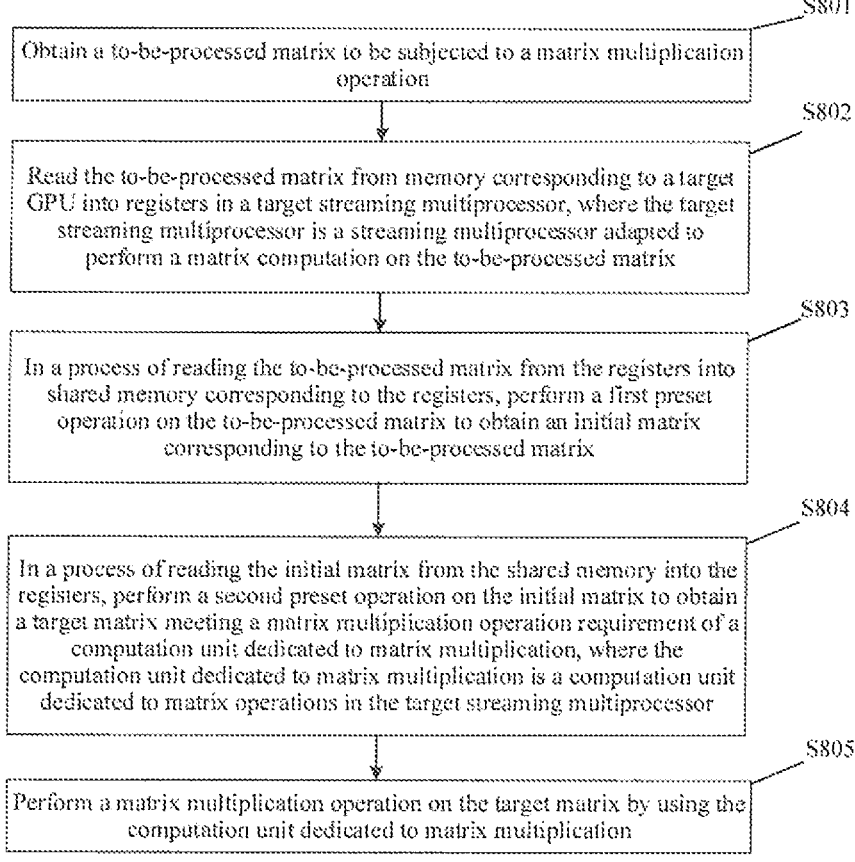
FIG. 8 is a flowchart of a data processing method applied to a GPU according to a fifth embodiment of this application.

FIG. 8 is a flowchart of a data processing method applied to a GPU according to the fifth embodiment of this application. The data processing method applied to a GPU shown in FIG. 8 includes steps S801 to S805.

In step S801, a to-be-processed matrix to be subjected to a matrix multiplication operation is obtained.

The to-be-processed matrix includes at least one of a first matrix arranged in column-major order and a second matrix arranged in row-major order. The first matrix and the second matrix are respectively the $1^{st}$ and the $2^{nd}$ matrices of two matrices to be subjected to a matrix multiplication operation. In other words, the to-be-processed matrix is a first matrix arranged in column-major order and/or a second matrix arranged in row-major order.

In the fifth embodiment of this application, a matrix arranged in row-major order means that elements in each row in the matrix are contiguously arranged in memory. A matrix arranged in column-major order means that elements in each column in the matrix are contiguously arranged in memory.

In step S802, the to-be-processed matrix is read from memory corresponding to a target GPU into registers in a target streaming multiprocessor, where the target streaming multiprocessor is a streaming multiprocessor adapted to perform a matrix computation on the to-be-processed matrix.

In the fifth embodiment of this application, a register is a high-speed on-chip cache of a GPU.

The register is 32 bits (binary digit, binary unit) wide. In other words, the register can store a file with a size of 32 bits.

In step S803, in a process of reading the to-be-processed matrix from the registers into shared memory corresponding to the registers, a first preset operation is performed on the to-be-processed matrix to obtain an initial matrix corresponding to the to-be-processed matrix.

In the fifth embodiment of this application, the first preset operation is: starting from the first row, arranging elements in every the second number of times of rows in the matrix alternately in turn to combine into one row.

In step S804, in a process of reading the initial matrix from the shared memory into the registers, a second preset operation is performed on the initial matrix to obtain a target matrix meeting a matrix multiplication operation requirement of a computation unit dedicated to matrix multiplication, where the computation unit dedicated to matrix multiplication is a computation unit dedicated to matrix-related operations in the target streaming multiprocessor.

In the fifth embodiment of this application, the target matrix is a target matrix that meets a matrix multiplication operation requirement of the target GPU. The matrix multiplication operation requirement of the target GPU is predetermined based on hardware conditions of the target GPU. For example, when an integer type of elements in a matrix to be input is INT8, it is required that the $1^{st}$ matrix of two matrices to be subjected to multiplication be arranged in row-major order and that the $2^{nd}$ matrix of the two matrices be arranged in column-major order. In this case, the matrix multiplication operation requirement of the target GPU is that a first matrix of two matrices to be subjected to multiplication is arranged in row-major order and a second matrix of the two matrices is arranged in column-major order.

The second preset operation is: starting from the first column, performing a transposition on the matrix by taking every the third number of times of columns in the matrix as one column to obtain a target matrix, and reading the target matrix into the registers.

In step S805, a matrix multiplication operation is performed on the target matrix by using the computation unit dedicated to matrix multiplication.

Although this application is disclosed as above with preferred embodiments, these preferred embodiments are not intended to limit this application. Any person skilled in the art can make possible changes and modifications without departing from the spirit and scope of this application. Therefore, the protection scope of this application should be subjected to the scope defined by the claims of this application.

In a typical configuration, a computing device includes one or more processors (CPU), an input/output interface, a network interface, and a memory.

The memory may include a non-permanent memory, a random access memory (random access memory, RAM), a non-volatile memory, and/or the like in a computer readable medium, for example, a read-only memory (read-only memory, ROM) or a flash RAM. A memory is an example of computer readable media.

1. Computer readable media include permanent, non-permanent, removable, and non-removable media and can store information by using any method or technology. The information may be computer-readable instructions, data structures, modules of programs, or other data. Examples of computer storage media include but are not limited to: phase-change memory (PRAM), static random access memory (SRAM), dynamic random access memory (DRAM), other types of random access memory (RAM), read-only memory (ROM), electrically erasable programmable read-only memory (EEPROM), flash memory or other memory technologies, compact disc read-only memory (CD-ROM), digital video disc (DVD) or other optical memories, magnetic cassette, magnetic disk storage, other magnetic storage devices, and any other non-transmission media that may be adapted to store information that is accessible by a computing device. As defined in this specification, computer readable media do not include computer readable non-transitory media (Non-Transitory Media), for example, modulated data signals and carrier waves.

2. A person skilled in the art should understand that the embodiments of this application can be provided as a method, a system, or a computer program product. Therefore, this application may use a form of hardware only embodiments, software only embodiments, or software-hardware combined embodiments. Moreover, this application may use a form of a computer program product that is implemented on one or more computer-usable storage media (including but not limited to a magnetic disk memory, a CD-ROM, an optical memory, and the like) that include computer-usable program code.

The invention claimed is:

1. A data processing method performed by a streaming multiprocessor of a graphics processing unit (GPU), comprising:

reading a to-be-processed matrix from memory corresponding to a target GPU into registers in a target streaming multiprocessor, wherein the target streaming multiprocessor is a streaming multiprocessor adapted to perform matrix computation on the to-be-processed matrix, wherein the reading comprises:

obtaining a first number of times that a number of bits of each register is as much as a number of bits corresponding to an integer type of elements in the to-be-processed matrix; and starting from a first column, reading every the first number of times of elements in a same row of the to-be-processed matrix into the registers based on the first number of times;

in a process of reading the to-be-processed matrix from the registers into shared memory corresponding to the registers, performing a first preset operation on the to-be-processed matrix by starting from a first row of the to-be-processed matrix, arranging elements in every second number of times of rows of the to-be-processed matrix alternately in turn to combine into one row, and reading resulting rows into the shared memory, to obtain an initial matrix corresponding to the to-be-processed matrix; and in a process of reading the initial matrix from the shared memory into the registers, performing a second preset operation on the initial matrix to obtain a target matrix meeting a matrix multiplication operation requirement of a computation unit dedicated to matrix multiplication, wherein the computation unit dedicated to matrix multiplication is a computation unit dedicated to matrix-related operations in the target streaming multiprocessor.

2. The data processing method applied to a GPU according to claim 1, wherein the obtaining a first number of times that a number of bits of the register is as much as a number of bits corresponding to an integer type of elements in the to-be-processed matrix comprises:

obtaining the number of bits of the register;

obtaining the number of bits corresponding to the integer type of elements in the to-be-processed matrix; and determining the first number of times based on the number of bits of the register and the number of bits corresponding to the integer type of elements in the to-be-processed matrix.

3. The data processing method applied to a GPU according to claim 1, wherein the performing a first preset operation on the to-be-processed matrix to obtain an initial matrix corresponding to the to-be-processed matrix comprises:

obtaining a first read-in instruction specific to the to-be-processed matrix, wherein the first read-in instruction is specific to a first integer type;

obtaining the second number of times that a number of bits corresponding to the first integer type is as much as a number of bits corresponding to an integer type of elements in the to-be-processed matrix;

determining the first preset operation specific to the to-be-processed matrix based on the second number of times.

4. The data processing method applied to a GPU according to claim 3, wherein the second number of times is 2; and the starting from the first row, arranging elements in every the second number of times of rows in the to-be-processed matrix alternately in turn to combine into one row, and reading the resulting rows into the shared memory to obtain the initial matrix comprises: starting from the first row, arranging elements in every two rows in the to-be-processed matrix alternately in turn to combine into one row, and reading the resulting rows into the shared memory to obtain the initial matrix.

5. The data processing method applied to a GPU according to claim 4, wherein the second number of times is 2, comprising that the number of bits corresponding to the first integer type is 16 and the number of bits corresponding to the integer type of elements in the to-be-processed matrix is 8; or the number of bits corresponding to the first integer type is 32 and the number of bits corresponding to the integer type of elements in the to-be-processed matrix is 16.

6. The data processing method applied to a GPU according to claim 3, wherein the second number of times is 1; and the starting from the first row, arranging elements in every the second number of times of rows in the to-be-processed matrix alternately in turn to combine into one row and reading the resulting rows into the shared memory to obtain the initial matrix comprises: starting from the first row, arranging elements in every one row in the to-be-processed matrix alternately in turn to combine into one row, and reading the resulting rows into the shared memory to obtain the initial matrix.

7. The data processing method applied to a GPU according to claim 1, wherein the performing a second preset operation on the initial matrix to obtain a target matrix meeting a matrix multiplication operation requirement of the computation unit dedicated to matrix multiplication comprises:

obtaining a second read-in instruction specific to the initial matrix, wherein the second read-in instruction carries a second integer type that the second read-in instruction is specific to;

obtaining a third number of times that a number of bits corresponding to the second integer type is as much as a number of bits corresponding to an integer type of elements in the initial matrix;

determining the second preset operation specific to the initial matrix based on the third number of times, wherein the second preset operation is: starting from the first column, performing a transposition on the matrix by taking every the third number of times of columns in the matrix as one column to obtain a target matrix, and reading the target matrix into the registers; and starting from the first column, performing a transposition on the initial matrix by taking every the third number of times of columns in the initial matrix as one column to obtain the target matrix, and reading the target matrix into the registers.

8. The data processing method applied to a GPU according to claim 7, wherein the third number of times is 2; and the starting from the first column, performing a transposition on the initial matrix by taking every the third number of times of columns in the initial matrix as one column to obtain the target matrix, and reading the target matrix into the registers comprises: starting from the first column, performing a transposition on the initial matrix by taking every two columns in the initial matrix as one column to obtain the target matrix, and reading the target matrix into the registers.

9. The data processing method applied to a GPU according to claim 8, wherein the third number of times is 2, comprising that the number of bits corresponding to the second integer type is 16 and the number of bits corresponding to the integer type of elements in the initial matrix is 8; or the number of bits corresponding to the second integer type is 32 and the number of bits corresponding to the integer type of elements in the initial matrix is 16.

10. The data processing method applied to a GPU according to claim 1, wherein a number of rows and a number of columns of the to-be-processed matrix are both 2 to the power of a natural number.

11. The data processing method applied to a GPU according to claim 10, wherein the to-be-processed matrix comprises at least one of a first matrix arranged in column-major order and a second matrix arranged in row-major order, and the first matrix and the second matrix are respectively the $1^{st}$ and the $2^{nd}$ matrices of two matrices to be subjected to a matrix multiplication operation.

12. A data processing apparatus comprising:
a to-be-processed matrix reading unit adapted to read a to-be-processed matrix from memory corresponding to a target computation unit into register of the target computation unit, wherein the to-be-processed matrix reading unit is further adapted to:
obtain a first number of times that a number of bits of each register is as much as a number of bits corresponding to an integer type of elements in the to-be-processed matrix; and
starting from a first column, read every the first number of times of elements in a same row of the to-be-processed matrix into the registers based on the first number of times;
a first preset operation execution unit adapted to: in a process of reading the to-be-processed matrix by starting from a first row of the to-be-processed matrix, arrange elements in every second number of times of rows of the to-be-processed matrix alternately in turn to combine into one row and read resulting rows into the shared memory from the registers into shared memory corresponding to the registers, perform a first preset operation on the to-be-processed matrix elements, to obtain an initial matrix corresponding to the to-be-processed matrix;
a second preset operation execution unit, adapted to: in a process of reading the initial matrix from the shared memory into the registers, perform a second preset operation on the initial matrix to obtain a target matrix meeting a matrix multiplication operation requirement of the target computation unit dedicated to matrix-related operations.

13. The data processing apparatus of claim 12, further comprising:
the target computation unit adapted to compute a matrix multiplication operation on the target matrix.

14. The data processing apparatus of claim 12, wherein performing the first preset operation comprises:
obtaining the second number of times that a number of bits corresponding to the first integer type is as much as a number of bits corresponding to an integer type of elements in the to-be-processed matrix.

15. The data processing apparatus of claim 12, wherein performing the second present operation comprises:
obtaining a third number of times that a number of bits corresponding to a second integer type is as much as a number of bits corresponding to an integer type of elements in the initial matrix; and
starting from the first column, performing a transposition on the initial matrix by taking every the third number of times of columns in the initial matrix as one column to obtain the target matrix.

16. A data processing method comprising:
obtaining a to-be-processed matrix including at least one of a first matrix arranged in column-major order and a second matrix arranged in row-major order;
reading the to-be-processed matrix from memory into registers in a target computation unit, where the reading comprises;
obtaining a first number of times that a number of bits of each register is as much as a number of bits corresponding to an integer type of elements in the to-be-processed matrix;
starting from a first column, reading every the first number of times of elements in a same row of the to-be-processed matrix into the registers based on the first number of times;
in a process of reading the to-be-processed matrix from the registers into shared memory corresponding to the registers of the target computation unit, performing a first preset operation on the to-be-processed matrix elements by starting from a first row of the to-be-processed matrix, arranging the elements in every second number of times of rows of the to-be-processed matrix alternately in turn to combine into one row, and reading resulting rows into the shared memory, to obtain an initial matrix corresponding to the to-be-processed matrix;
in a process of reading the initial matrix from the shared memory into the registers of the target computation unit, performing a second preset operation on the initial matrix to obtain a target matrix meeting a matrix multiplication operation requirement of the target computation unit; and
performing a matrix multiplication operation on the target matrix by using the target computation unit.

17. The data processing method according to claim 16, wherein:
performing the first preset operation includes:
obtaining a second number of times that a number of bits corresponding to the first integer type is as much as a number of bits corresponding to an integer type of elements in the to-be-processed matrix; and
performing the second preset operation includes:
obtaining a third number of times that a number of bits corresponding to s second integer type is as much as a number of bits corresponding to an integer type of elements in the initial matrix; and
starting from the first column, performing a transposition on the initial matrix by taking every the third number of times of columns in the initial matrix as one column to obtain the target matrix.

18. The data processing method according to claim 17, wherein obtaining a first number of times that a number of bits of the register is as much as a number of bits corresponding to an integer type of elements in the to-be-processed matrix includes:
obtaining the number of bits of the register;
obtaining the number of bits corresponding to the integer type of elements in the to-be-processed matrix; and
determining the first number of times based on the number of bits of the register and the number of bits corresponding to the integer type of elements in the to-be-processed matrix.

* * * * *